United States Patent
Yoo et al.

(10) Patent No.: US 10,131,202 B2
(45) Date of Patent: Nov. 20, 2018

(54) AIR CONDITIONING SYSTEM FOR HYBRID VEHICLES

(71) Applicant: HANON SYSTEMS, Daejeon (KR)

(72) Inventors: Sang Jun Yoo, Daejeon (KR); Chang Hyun Baek, Daejeon (KR)

(73) Assignee: HANON SYSTEMS, Daejeon (KR)

( * ) Notice: Subject to any disclaimer, the term of this patent is extended or adjusted under 35 U.S.C. 154(b) by 0 days.

(21) Appl. No.: 15/110,118

(22) PCT Filed: Sep. 23, 2015

(86) PCT No.: PCT/KR2015/010017
§ 371 (c)(1),
(2) Date: Jul. 7, 2016

(87) PCT Pub. No.: WO2016/048033
PCT Pub. Date: Mar. 31, 2016

(65) Prior Publication Data
US 2017/0190235 A1     Jul. 6, 2017

(30) Foreign Application Priority Data

Sep. 23, 2014 (KR) .................. 10-2014-0126658
Sep. 23, 2015 (KR) .................. 10-2015-0134437

(51) Int. Cl.
| | | |
|---|---|---|
| B60H 1/00 | (2006.01) |
| B60H 1/03 | (2006.01) |
| B60W 20/40 | (2016.01) |
| F02N 11/08 | (2006.01) |
| B60H 1/06 | (2006.01) |

(52) U.S. Cl.
CPC ........ *B60H 1/00885* (2013.01); *B60H 1/004* (2013.01); *B60H 1/00778* (2013.01); *B60H 1/00878* (2013.01); *B60H 1/034* (2013.01); *B60H 1/06* (2013.01); *B60W 20/40* (2013.01); *F02N 11/084* (2013.01); *F02N 11/0829* (2013.01); *F01P 2037/00* (2013.01); *F01P 2050/24* (2013.01); *F02N 2200/023* (2013.01); *F02N 2200/0804* (2013.01); *F02N 2200/122* (2013.01); *Y02T 10/48* (2013.01)

(58) Field of Classification Search
None
See application file for complete search history.

(56) References Cited

FOREIGN PATENT DOCUMENTS

| | | |
|---|---|---|
| JP | 2009255917 A | 11/2009 |
| KR | 20090126745 A | 12/2009 |
| KR | 20110032082 A | 3/2011 |
| KR | 101154207 B1 | 6/2012 |
| KR | 20120060112 A | 6/2012 |

*Primary Examiner* — James M McPherson
(74) *Attorney, Agent, or Firm* — Shumaker, Loop & Kendrick, LLP; James D. Miller

(57) ABSTRACT

An air conditioning system for hybrid vehicles includes a control unit configured to re-operate an engine if an engine cooling water temperature is reduced to a lower limit value or less after entry into a motor drive mode, and configured to stop the engine if the engine cooling water temperature is increased to an upper limit value or more. The control unit is configured to change the upper limit value and the lower limit value depending on a target air injection temperature calculated according to an internal/external temperature condition and a user-set temperature so that, in the motor drive mode, a re-operation time point of the engine is actively changed according to the target air injection temperature.

10 Claims, 6 Drawing Sheets

AIR CONDITIONING SYSTEM FOR HYBRID VEHICLES

CROSS-REFERENCE TO RELATED APPLICATIONS

This application is a United States national phase patent application based on PCT/KR2015/010017 filed Sep. 23, 2015, which claims the benefit of Korean Patent Application No. 10-2014-0126658 filed Sep. 23, 2014 and Korean Patent Application No. 10-2015-0134437 filed Sep. 23, 2015. The disclosures of the above patent applications are hereby incorporated herein by reference in their entirety.

TECHNICAL FIELD

The present invention relates to an air conditioning system for hybrid vehicles. More particularly, the present invention pertains to an air conditioning system for hybrid vehicles capable of compensating a vehicle room temperature in an optimal state by optimally correcting an opening position of a temperature door during a motor drive mode and capable of preventing an unnecessary re-operation of an engine and consequently improving fuel efficiency by re-operating the engine depending on the temperature of an engine cooling water during a motor drive mode so that an engine re-operation time point varies depending on a target injection temperature and a temperature door opening position.

BACKGROUND ART

A hybrid vehicle refers to a motor vehicle that uses an electric motor and an internal combustion engine as drive power sources. In the case where the drive load of the hybrid vehicle is large, for example, when the hybrid vehicle is driven at a high speed or when the hybrid vehicle is driven on an uphill road, the hybrid vehicle is operated in an engine drive mode in which the internal combustion engine is used.

Conversely, in the case where the drive load of the hybrid vehicle is small, for example, when the hybrid vehicle is driven at a low speed or when the hybrid vehicle is stopped, the hybrid vehicle is operated in a motor drive mode in which the electric motor is used.

In this hybrid vehicle, the minimized use of the engine makes it possible to suppress unnecessary fuel consumption and to reduce emission of an exhaust gas. It is therefore possible to increase the fuel efficiency and to reduce the air pollution.

However, the frequent stop of the engine of the hybrid vehicle limits the operation of an air conditioning system for heating a vehicle room. This leads to a problem in that the vehicle room heating efficiency is sharply reduced.

Specifically, as shown in FIG. 1, if the drive load of a hybrid vehicle is reduced and if the drive mode of the hybrid vehicle is switched from an engine drive mode to a motor drive mode, the engine is stopped (see curve A in FIG. 1). As a result, the temperature of engine cooling water is reduced (see curve B in FIG. 1). Thus, the engine cooling water having a low temperature is supplied to a heater core of an air conditioning system, thereby reducing the temperature of the heater core (see curve C in FIG. 1). Consequently, the temperature of an air injected into a vehicle room is reduced (see curve D in FIG. 1). This reduces the vehicle room heating efficiency and significantly impairs the ride comfort.

In view of this problem, there has been proposed a technique of preventing a vehicle room temperature from being reduced even when a temperature of a heater core is dropped due to the stoppage of an engine. In this technique, as shown in FIG. 2, when the drive mode of a motor vehicle is switched from an engine drive mode to a motor drive mode in which an engine is stopped (see curve A in FIG. 2), an opening angle of a temperature door (see curve E in FIG. 2) is corrected in response to the reduction of an engine cooling water temperature caused by the stoppage of the engine. Specifically, when the engine is stopped (see curve A in FIG. 2) and when the engine cooling water temperature is reduced (see curve B in FIG. 2), the opening angle of the temperature door is corrected in proportion to the reduction of the engine cooling water temperature so that a hot air path is further opened (see curve E in FIG. 2).

Accordingly, the temperature of the air injected into the vehicle room can be increased even when the engine cooling water temperature is reduced due to the stoppage of the engine (see curve F in FIG. 2). Thus, it is possible to compensate the reduction of the vehicle room temperature even when the engine cooling water temperature is reduced due to the stoppage of the engine and even when the heater core temperature is eventually reduced. As a result, it is possible to maintain the vehicle room temperature at a desired temperature regardless of the operation or stoppage of the engine.

In the meantime, as illustrated in FIG. 3, if the engine cooling water temperature is excessively reduced to a predetermined lower limit value during a motor drive mode, the engine is re-operated. Thereafter, if the engine cooling water temperature is increased to a predetermined upper limit value or more, the engine is stopped again. Thus, the engine cooling water temperature can be maintained between the predetermined upper limit value and the predetermined lower limit value. The reason for employing this configuration is to prevent excessive reduction of the engine cooling water temperature, thereby maintaining the heating performance substantially constant.

However, the technique of the related art is configured to correct the opening angle of the temperature door based on the reduction of the engine cooling water temperature in the motor drive mode. For that reason, in the motor drive mode, it is impossible to accurately control the opening angle of the temperature door in conformity with the change in the actual temperature of the air injected into the vehicle room. This makes it impossible to accurately compensate the vehicle room injection air temperature in the motor drive mode.

In the motor drive mode, the change (reduction) of the vehicle room injection air temperature is affected by different factors such as an engine cooling water temperature, a blower air volume, an evaporator temperature, an internal/external air temperature, a solar radiation amount and the like.

Thus, in the technique of the related art in which the opening angle of the temperature door is corrected solely based on the reduction of the engine cooling water temperature, it is impossible to accurately control the opening angle of the temperature door in conformity with the change in the temperature of the air injected into the vehicle room. This makes it impossible to accurately compensate the vehicle room injection air temperature in the motor drive mode. Thus, the vehicle room temperature cannot be maintained at a pleasant temperature in the motor drive mode.

In addition, in the technique of the related art, the engine is automatically re-operated if the engine cooling water temperature is a predetermined lower limit value or less in the motor drive mode. This leads to a problem in that the engine re-operation phenomenon occurs frequently.

Specifically, the engine is automatically re-operated regardless of a target air injection temperature set by a user if the engine cooling water temperature is a predetermined lower limit value or less. For that reason, the engine may be unnecessarily re-operated even when the target air injection temperature is set low and even when the vehicle room injection air temperature can be sufficiently compensated even under an engine cooling water temperature of a lower limit value or less.

Since the engine is automatically re-operated regardless of the opening angle of the temperature door if the engine cooling water temperature is a predetermined lower limit value or less, there is a problem in that the engine may be unnecessarily re-operated even when the vehicle room injection air temperature can be sufficiently compensated by controlling the opening angle of the temperature door without having to re-operating the engine. This poses a problem in that the engine re-operation phenomenon occurs frequently in the motor drive mode, consequently reducing the fuel efficiency.

SUMMARY OF THE INVENTION

Technical Problems

In view of the aforementioned problems, it is an object of the present invention to provide an air conditioning system for hybrid vehicles which is configured to, in a motor drive mode, accurately correct and control an opening angle of a temperature door based on an actual change in a temperature of an air injected into a vehicle room and which is capable of, in the motor drive mode, optimally controlling the opening angle of the temperature door in conformity with the change in the temperature of the air injected into the vehicle room.

Another object of the present invention is to provide an air conditioning system for hybrid vehicles which is configured to, in a motor drive mode, optimally control an opening angle of a temperature door in conformity with a change in a temperature of an air injected into a vehicle room and which is capable of, in the motor drive mode, accurately compensating a vehicle room injection air temperature and optimally controlling a vehicle room temperature in the motor drive mode.

A further object of the present invention is to provide an air conditioning system for hybrid vehicles which is configured to, in a motor drive mode, control an engine re-operation time point in view of a target air injection temperature and which is capable of suppressing an engine re-operation while optimally controlling a vehicle room injection air temperature in conformity with a target air injection temperature and capable of preventing an unnecessary re-operation of an engine.

A still further object of the present invention is to provide an air conditioning system for hybrid vehicles which is configured to, in a motor drive mode, control an engine re-operation time point in association with an opening angle of a temperature door and which is capable of sufficiently compensating a vehicle room injection air temperature by merely controlling the opening angle of the temperature door without having to re-operate an engine and capable of preventing an unnecessary re-operation of the engine.

A yet still further object of the present invention is to provide an air conditioning system for hybrid vehicles which is configured to prevent an unnecessary re-operation of an engine and which is capable of preventing a frequent re-operation of an engine and consequently improving the fuel efficiency.

Technical Solutions

In order to achieve the above objects, there is provided an air conditioning system for hybrid vehicles, including:

a control unit configured to re-operate an engine if an engine cooling water temperature is reduced to a lower limit value or less after entry into a motor drive mode, and configured to stop the engine if the engine cooling water temperature is increased to an upper limit value or more, wherein the control unit is configured to change the upper limit value and the lower limit value depending on a target air injection temperature calculated according to an internal/external temperature condition and a user-set temperature so that, in the motor drive mode, a re-operation time point of the engine is actively changed according to the target air injection temperature.

Preferably, the control unit is configured to calculate the lower limit value from a current target air injection temperature and a predetermined first compensation value using equation (1):

lower limit value ($L$)=current target air injection temperature ($M$)+first compensation value ($\alpha$)  (1), and wherein the control unit is configured to calculate the upper limit value from the current target air injection temperature and a predetermined second compensation value using equation (2):

upper limit value ($U$)=current target air injection temperature ($M$)+second compensation value ($\beta$)  (2).

The first compensation value and the second compensation value are constant values for compensating a measurement error of the engine cooling water temperature, and the second compensation value is larger than the first compensation value.

The control unit is configured to, in the motor drive mode, re-operate the engine only when the temperature door is in a maximum heating position even if the engine cooling water temperature is reduced to the lower limit value or less.

Advantageous Effects

According to the present air conditioning system for hybrid vehicles, in the motor drive mode, the opening position of the temperature door is corrected in response to the change in the vehicle room injection air temperature and in view of different factors that affect the actual change in the vehicle room injection air temperature. It is therefore possible to optimally correct the opening position of the temperature door in conformity with the actual change in the injection air temperature.

Furthermore, in the motor drive mode, the opening angle of the temperature door is optimally controlled in conformity with the actual change in the injection air temperature. It is therefore possible to, in the motor drive mode, accurately compensate the vehicle room injection air temperature and to optimally control the vehicle room temperature in the motor drive mode.

Furthermore, in the motor drive mode, the engine is re-operated depending on the engine cooling water temperature. The engine re-operation time point is variably controlled according to the target air injection temperature. It is therefore possible to suppress the engine re-operation while optimally controlling the vehicle room injection air temperature in conformity with the target air injection temperature and to prevent the unnecessary re-operation of the engine.

Furthermore, in the motor drive mode, the engine is re-operated depending on the engine cooling water temperature. The engine re-operation time point is controlled in association with the opening angle of the temperature door. It is therefore possible to sufficiently compensate the vehicle room injection air temperature by merely controlling the opening angle of the temperature door without having to re-operate the engine and to prevent the unnecessary re-operation of the engine.

In addition, since the unnecessary re-operation of the engine is prevented, it is possible to prevent the frequent re-operation of the engine and to improve the fuel efficiency.

MODE FOR CARRYING OUT THE INVENTION

Figure 1:
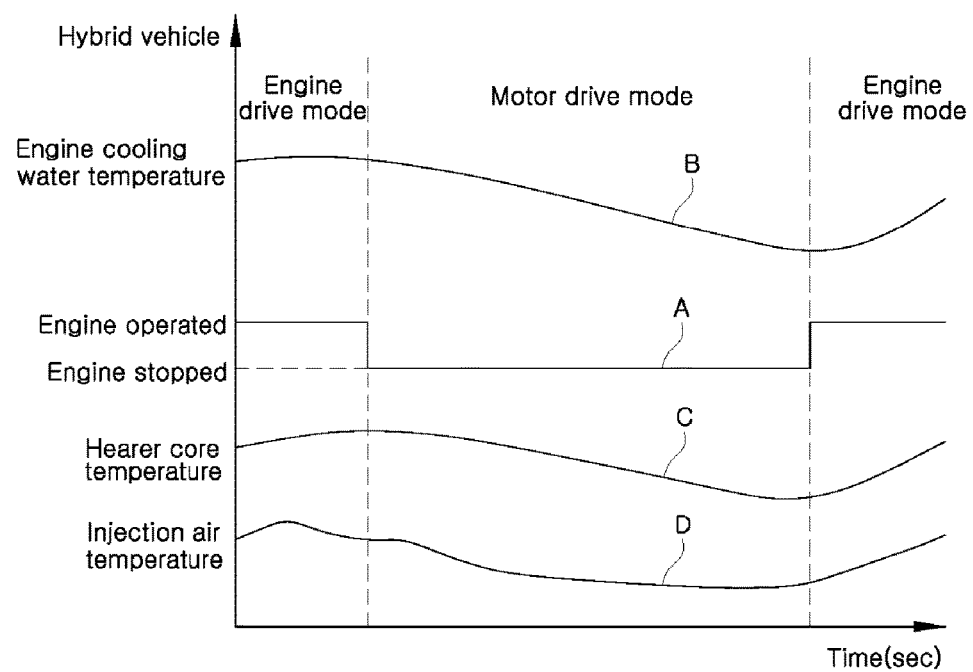
FIG. 1 is a graph showing an engine cooling water temperature and a vehicle room injection air temperature when the drive mode of a hybrid vehicle of the related art is switched from an engine drive mode to a motor drive mode.

A preferred embodiment of an air conditioning system for hybrid vehicles according to the present invention will now be described in detail with reference to the accompanying drawings. Components similar to those of the related art described earlier will be designated by like reference symbols.

Prior to describing features of an air conditioning system for hybrid vehicles according to the present invention, an air conditioning system for motor vehicles will be briefly described with reference to FIG. 4.

The air conditioning system for motor vehicles includes an air conditioner case 1 within which a blower 3, an evaporator 5 and a heater core 7 are installed.

The blower 3 is configured to draw an internal or external air and to blow the air toward an internal path 1a of the air conditioner case 1. The evaporator 5 is configured to cool the air blown toward the internal path 1a. The heater core 7 is configured to heat the air blown toward the internal path 1a. Particularly, the heater core 7 is configured to receive high-temperature cooling water from an engine 8. The heater core 7 allows the cooling water to exchange heat with the ambient air, thereby heating the air blown into a vehicle room.

The air conditioning system includes a temperature door 9 installed in the internal path 1a of the air conditioner case 1. The temperature door 9 is installed at a branch point of a cold air path 1b and a hot air path 1c. The temperature door 9 is configured to adjust the opening amounts of the cold air path 1b and the hot air path 1c while swinging between the cold air path 1b and the hot air path 1c. Thus, the temperature door 9 adjusts a cold air amount or a hot air amount supplied into the vehicle room.

Figure 2:
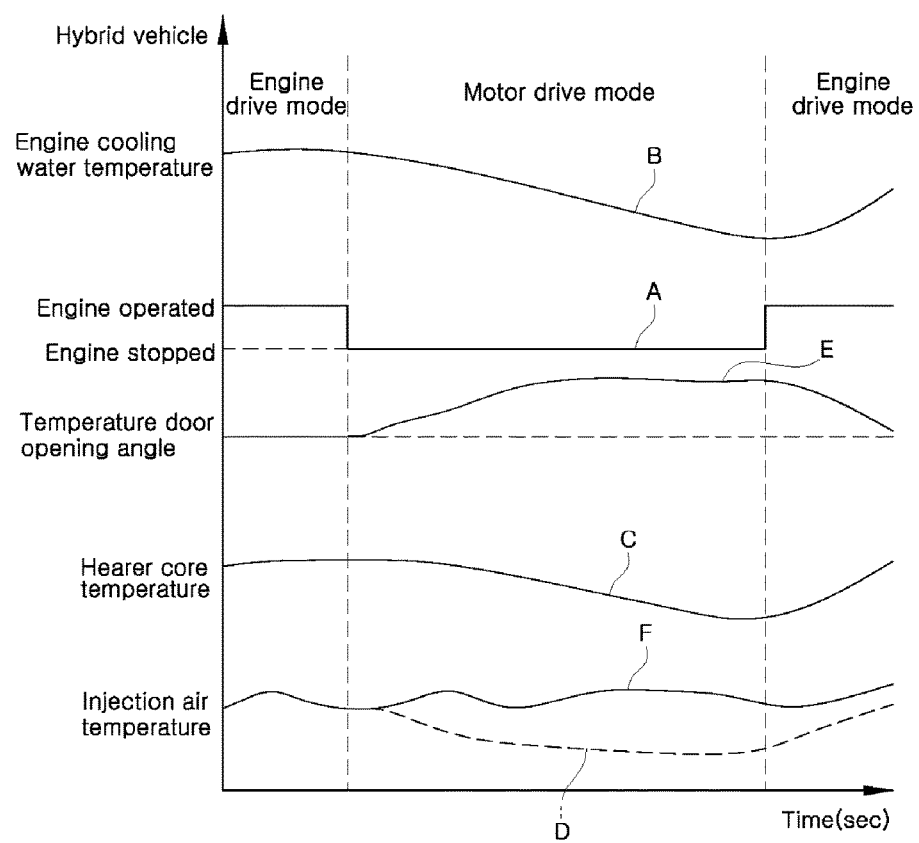
FIG. 2 is a graph showing an engine cooling water temperature and a vehicle room injection air temperature when the drive mode of another hybrid vehicle of the related art is switched from an engine drive mode to a motor drive mode.
Figure 3:
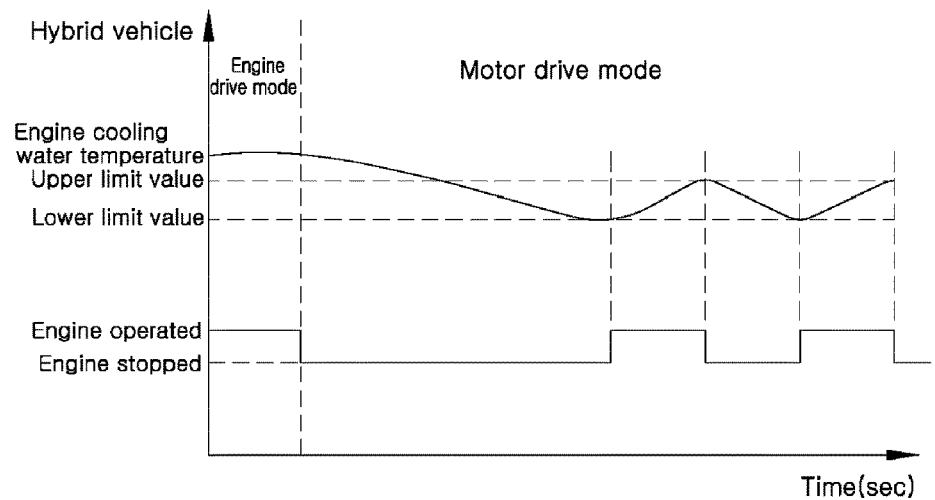
FIG. 3 is a graph showing a state in which an engine is on-off controlled depending on an engine cooling water temperature when a hybrid vehicle of the related art is controlled in a motor drive mode.

In the air conditioning system for hybrid vehicles, as shown in FIG. 2, if the drive mode of a hybrid vehicle is switched from an engine drive mode to a motor drive mode, the engine 8 is stopped (see curve A) and the engine cooling water temperature is lowered (see curve B).

The temperature of the heater core 7 is also lowered due to the lowered cooling water temperature (see curve C). Thus, the temperature of the air injected into the vehicle room is lowered (see curve D). As a result, the vehicle room heating efficiency is reduced.

Next, some features of the air conditioning system for hybrid vehicles according to the present invention will be described in detail with reference to FIGS. 4 to 8.

Figure 4:
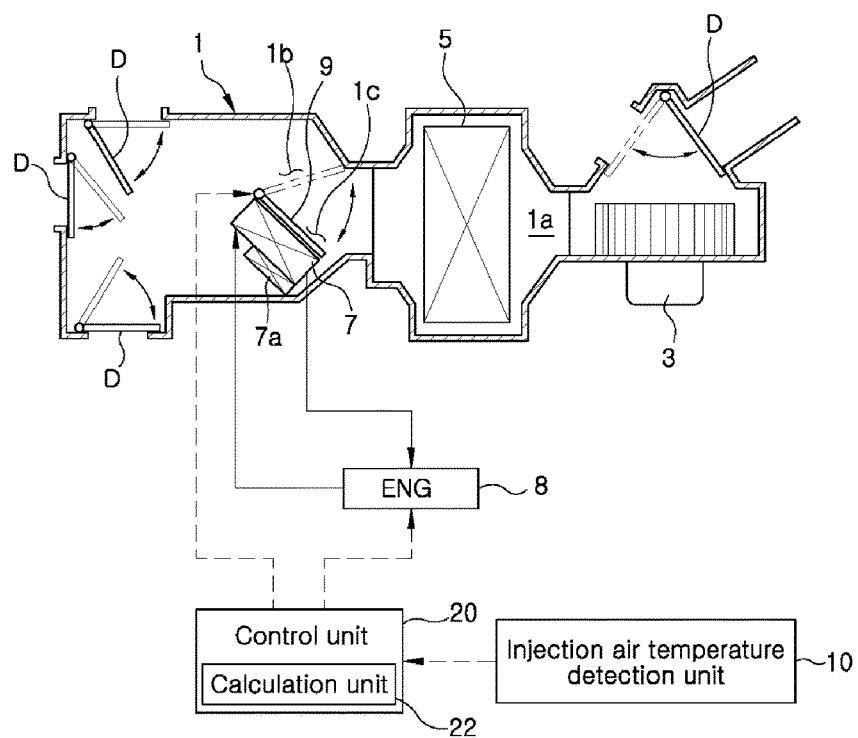
FIG. 4 is a view illustrating the configuration of an air conditioning system for hybrid vehicles according to the present invention.

Referring first to FIG. 4, the air conditioning system of the present invention includes an injected air temperature detection unit 10 configured to detect an actual temperature of an air injected into a vehicle room. The injected air temperature detection unit 10 is formed of temperature sensors installed in some of vehicle room air injection vents. For example, the injected air temperature detection unit 10 is formed of a center vent temperature sensor installed in a vehicle room center vent and a floor vent temperature sensor installed in a vehicle room floor vent.

The injected air temperature detection unit 10 is configured to directly detect an actual temperature of an air injected into the vehicle room and to input data on the detected air temperature to a control unit 20 which will be described below.

The air conditioning system of the present invention includes a control unit 20. The control unit 20 is formed of a microprocessor and is provided with a calculation unit 22.

If the drive mode of the hybrid vehicle is switched from an engine drive mode to a motor drive mode when the data on a vehicle room injection air temperature is inputted from the injected air temperature detection unit 10, the calculation unit 22 calculates a temperature difference E-now between a target air injection temperature and a vehicle room injection air temperature at the present time and a temperature difference E-prev between a target air injection temperature and a vehicle room injection air temperature at the previous time, for example, 5 seconds earlier than the present time, in a predetermined time interval, for example, in a several millisecond interval from the time point at which the engine drive mode is switched to the motor drive mode.

For reference, the target air injection temperature is a value for optimally controlling an evaporator 5, a PTC heater 7a and various kinds of doors D and is set based on a user-set temperature, an evaporator temperature, an external air temperature, an internal air temperature, a solar radiation amount and so forth. This means that the target air injection temperature indirectly contains those factors that cause a change in the vehicle room injection air temperature, namely the user-set temperature, the evaporator temperature, the external air temperature, the internal air temperature, the solar radiation amount and so forth.

After entry into the motor drive mode, if the temperature difference E-now between the target air injection temperature and the vehicle room injection air temperature at the present time and the temperature difference E-prev between the target air injection temperature and the vehicle room injection air temperature at the previous time are calculated in a predetermined time interval (an interval of 5 seconds) by the calculation unit 22, the control unit 20 finally calculates an opening position correction value T-now of the temperature door 9 with respect to the cold air path 1b and the hot air path 1c by processing the temperature differences E-now and E-prev and a temperature door opening position T-prev using the following equation (1) pre-stored in the control unit 20.

$$T\text{-now}=T\text{-prev}+Cp\times[Gp\times(E\text{-now}-E\text{-prev})+Gi\times E\text{-now}] \quad (1)$$

In equation (1), T-now is an opening position correction value (V) of the temperature door, T-prev is an opening position (V) of the temperature door at the previous time, Cp is a proportional gain, Gp is a constant value with respect to the temperature difference, E-now is a temperature difference (° C.) between the target air injection temperature and the vehicle room injection air temperature at the present time, E-prev is a temperature difference (° C.) between the target air injection temperature and the vehicle room injection air temperature at the previous time, and Gi is an integral gain.

In this regard, Cp, Gp and Gi are the constant values pre-stored in the control unit 20 and are found through several experiments.

The opening position correction value T-now of the temperature door 9 represented by equation (1) is a value calculated in view of the target air injection temperature, the vehicle room injection air temperature, the temperature difference at the present time and the temperature difference at the previous time. Use of equation (1) makes it possible to find an actual change in the vehicle room injection air temperature, which is generated by injection air temperature changing factors after entry into the motor drive mode. Thus, it is possible to calculate the opening position correction value T-now of the temperature door 9 that can compensate the actual change in the vehicle room injection air temperature.

The opening position correction value T-now of the temperature door 9 represented by equation (1) is calculated as a voltage value V applied to the temperature door 9 which adjusts the opening amount of the cold air path 1b or the hot air path 1c.

Upon calculating the opening position correction value T-now of the temperature door 9, the control unit 20 corrects the opening position of the temperature door 9 based on the opening position correction value T-now of the temperature door 9. This makes it possible to correct the opening position of the temperature door 9 in view of all the injection air temperature changing factors. Specifically, it is possible to correct the opening position of the temperature door 9 in view of the blower air volume, the evaporator temperature, the user-set temperature, the internal or external temperature, the solar radiation amount and the like, which may directly affect the change in the injection air temperature.

Accordingly, in the motor drive mode, it is possible to optimally correct the opening position of the temperature door 9 in conformity with the actual change in the vehicle room injection air temperature. As a result, the vehicle room injection air temperature can be accurately compensated in the motor drive mode. This makes it possible to optimally control the vehicle room temperature in the motor drive mode.

Referring again to FIG. 4, even when the opening position correction value T-now of the temperature door 9 is calculated in real time after entry into the motor drive mode, the control unit 20 does not unconditionally correct the opening position of the temperature door 9 based on the opening position correction value T-now. Only when all the predetermined entry conditions are met, the control unit 20 corrects the opening position of the temperature door 9.

The entry conditions include a condition that the engine cooling water temperature is equal to or lower than the target air injection temperature, a condition that the temperature door 9 is moved to a maximum heating position to open the hot air path 1c at the maximum, and a condition that the vehicle room injection air temperature is equal to or lower than the target air injection temperature.

The control unit 20 is configured to correct the opening position of the temperature door 9 according to the opening position correction value T-now of the temperature door 9 represented by equation (1), only when the condition that the engine cooling water temperature is equal to or lower than the target air injection temperature, the condition that the temperature door 9 is moved to a maximum heating position, and the condition that the vehicle room injection air temperature is equal to or lower than the target air injection temperature, are met.

The reason for employing this configuration is that if the engine cooling water temperature exceeds the target air injection temperature, the engine cooling water temperature is sufficiently high and the opening position of the temperature door 9 need not be compensated.

Furthermore, if the vehicle room injection air temperature exceeds the target air injection temperature, the vehicle room injection air temperature is sufficiently high and the opening position of the temperature door 9 need not be compensated.

In the case where the condition that the temperature door 9 is moved to a maximum heating position is not met, the vehicle room injection air temperature can be sufficiently compensated by merely controlling the opening angle of the temperature door 9 with respect to the hot air path 1c without having to use equation (1).

Other examples of the entry condition include a condition that the engine cooling water temperature is equal to or lower than a first entry reference temperature obtained by adding a predetermined first temperature compensation value to the target air injection temperature, a condition that the temperature door 9 is moved to a maximum heating position, and a condition that the vehicle room injection air temperature is equal to or lower than a second entry reference temperature obtained by subtracting a predetermined second temperature compensation value from the target air injection temperature.

The control unit 20 may be configured to correct the opening position of the temperature door 9 according to the opening position correction value T-now of the temperature door 9 calculated by equation (1), only when the condition that the engine cooling water temperature is equal to or lower than the first entry reference temperature obtained by adding the predetermined first temperature compensation value to the target air injection temperature, the condition that the temperature door 9 is moved to a maximum heating position, and the condition that the vehicle room injection air temperature is equal to or lower than the second entry reference temperature obtained by subtracting the predetermined second temperature compensation value from the target air injection temperature, are met.

In this regard, the first temperature compensation value is a value set in view of a measurement error of the engine cooling water temperature and may preferably be set at 5° C. The second temperature compensation value is a value set in view of a measurement error of the vehicle room injection air temperature and may preferably be set at 2° C.

When the opening position of the temperature door 9 is compensated after entry into the motor drive mode, the control unit 20 is configured to stop opening position compensation control of the temperature door 9 using equation (1), if the motor drive mode is cancelled or a predetermined cancellation condition is met, for example, if a condition that the engine cooling water temperature is equal to or higher than a cancellation reference temperature obtained by adding a predetermined third temperature compensation value to the target air injection temperature, is met. In this regard, the third temperature compensation value may preferably be set at 10° C.

Referring again to FIGS. 4, 5 and 6, the control unit 20 is configured to re-operate the engine 8 when the engine cooling water temperature is lowered to a lower limit value L or less after entry into the motor drive mode. Furthermore, the control unit 20 is configured to stop the engine 8 when the engine cooling water temperature is increased to an upper limit value U or more after the re-operation of the engine 8.

In this case, the lower limit value L for re-operating the engine 8 is calculated by adding up a current target air injection temperature M and a first compensation value α as in equation (2) indicated below. The upper limit value U for stopping the re-operation of the engine 8 is calculated by adding up a current target air injection temperature M and a second compensation value β as in equation (3) indicated below. Equation (2) and equation (3) are stored in the control unit 20.

After entry into the motor drive mode, the control unit 20 monitors the current target air injection temperature M, the first compensation value α and the second compensation value β in real time using equation (2) and equation (3) and calculates the lower limit value L and the upper limit value U in real time. Then, the control unit 20 compares the lower limit value L and the upper limit value U with the engine cooling water temperature in real time and controls the re-operation and stop of the engine 8 in real time.

$$\text{Lower limit value } L = \text{current target air injection temperature } M + \text{first compensation value } \alpha \quad (2)$$

$$\text{Upper limit value } U = \text{current target air injection temperature } M + \text{second compensation value } \beta \quad (3)$$

In this regard, the first compensation value α and the second compensation value β are used to compensate a measurement value of the engine cooling water temperature and are found by several experiments. The second compensation value β is larger than the first compensation value α.

Figure 5:
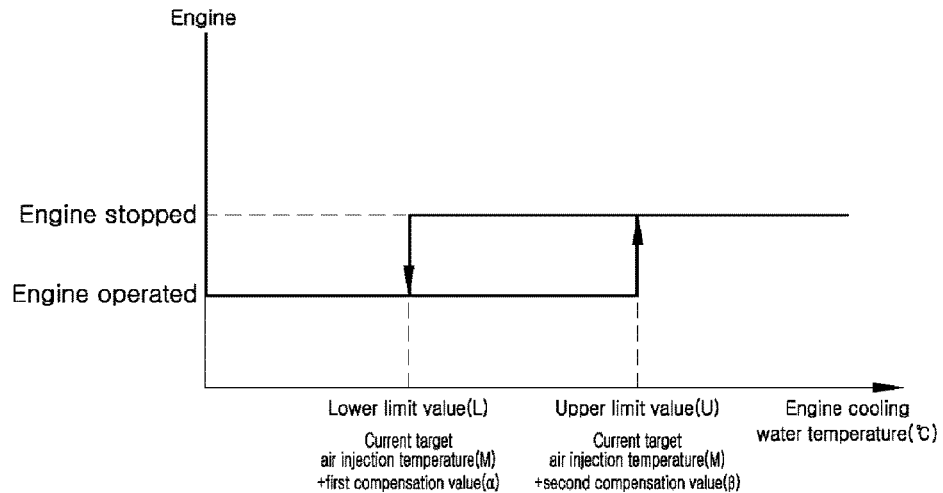
FIG. 5 is a graph showing a state in which an engine is on-off controlled depending on an engine cooling water temperature when the hybrid vehicle of the present invention is controlled in a motor drive mode.
Figure 6:
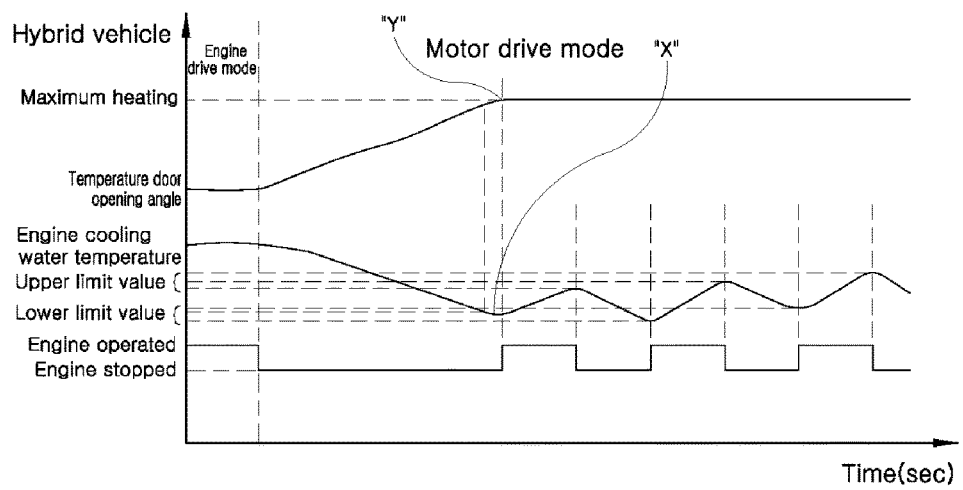
FIG. 6 is a graph showing a state in which an engine is on-off controlled depending on an engine cooling water temperature and an opening angle of a temperature door when the hybrid vehicle of the present invention is controlled in a motor drive mode.

In the air conditioning system of the present invention configured as above, after entry into the motor drive mode, the engine 8 is re-operated depending on the engine cooling water temperature. As illustrated in FIGS. 5 and 6, the lower limit value L and the upper limit value U as reference values for the determination of the re-operation of the engine 8 are changed based on the current target air injection temperature M. This makes it possible to, in the motor drive mode, actively change the re-operation time point of the engine 8 depending on the target air injection temperature.

Unlike the technique of the related art in which the re-operation time point of the engine 8 is controlled depending on one lower limit value and one upper limit value, it is possible in the present invention to actively control the re-operation time point of the engine 8.

Thus, in the case where the target air injection temperature is set low so that the vehicle room injection air temperature can be sufficiently compensated even under a relatively-low engine cooling water temperature, the re-operation time point of the engine 8 can be delayed in conformity with the low target air injection temperature.

As a result, it is possible to optimally control the vehicle room injection air temperature in conformity with the target air injection temperature, thereby suppressing the re-operation of the engine 8. This makes it possible to prevent unnecessary frequent re-operation of the engine 8 and to significantly improve the fuel efficiency.

Referring again to FIGS. 4 and 6, the control unit 20 does not unconditionally re-operate the engine 8 even when the engine cooling water temperature is lowered to the lower limit value L or less (see curve X in FIG. 6) after entry into the motor drive mode Determination is first made as to whether the temperature door 9 is moved to a maximum heating position to open the hot air path 1c at the maximum. Then, the control unit 20 re-operates the engine 8 only when the temperature door 9 opens the hot air path 1c at the maximum.

The reason for employing this configuration is that even if the engine cooling water temperature is lowered to the lower limit value L or less (see curve X in FIG. 6), the vehicle room injection air temperature can be sufficiently compensated by controlling the opening angle of the temperature door 9 with respect to the hot air path 1c.

After the vehicle room injection air temperature has been compensated by controlling the opening angle of the temperature door 9, the engine 8 is re-operated to control the vehicle room injection air temperature. This makes it possible to sufficiently compensate the vehicle room injection air temperature while delaying the re-operation of the engine 8 as far as possible. As a result, it is possible to prevent the unnecessary frequent re-operation of the engine 8 and to significantly improve the fuel efficiency of the hybrid vehicle.

After entry into the motor drive mode, the control unit 20 does not unconditionally re-operate the engine 8 even if the engine cooling water temperature is reduced to the aforementioned lower limit value L or less (see curve X in FIG. 6). The control unit 20 is configured to re-operate the engine 8 only when the target air injection temperature is equal to or higher than a value obtained by adding a predetermined temperature compensation value to the vehicle room injection air temperature. In this case, it is preferred that the temperature compensation value is set at 2° C.

After entry into the motor drive mode, the control unit 20 is configured to variably control the lower limit value L and the upper limit value U, which serve as criteria of the re-operation of the engine 8. If the motor drive mode is cancelled or if the aforementioned cancellation condition is satisfied, for example, if a condition that the engine cooling water temperature is equal to or higher than a cancellation reference temperature obtained by adding a predetermined third temperature compensation value to the target air injection temperature is satisfied, the control unit 20 stops the variable control of the lower limit value L and the upper limit value U and returns the lower limit value L and the upper limit value U to the original state.

Next, an operation example of the present air conditioning system configured as above will be described with reference to FIGS. 4, 7 and 8.

First, descriptions will be made on an operation example of compensating the opening position of the temperature door 9 in the motor drive mode.

Figure 7:
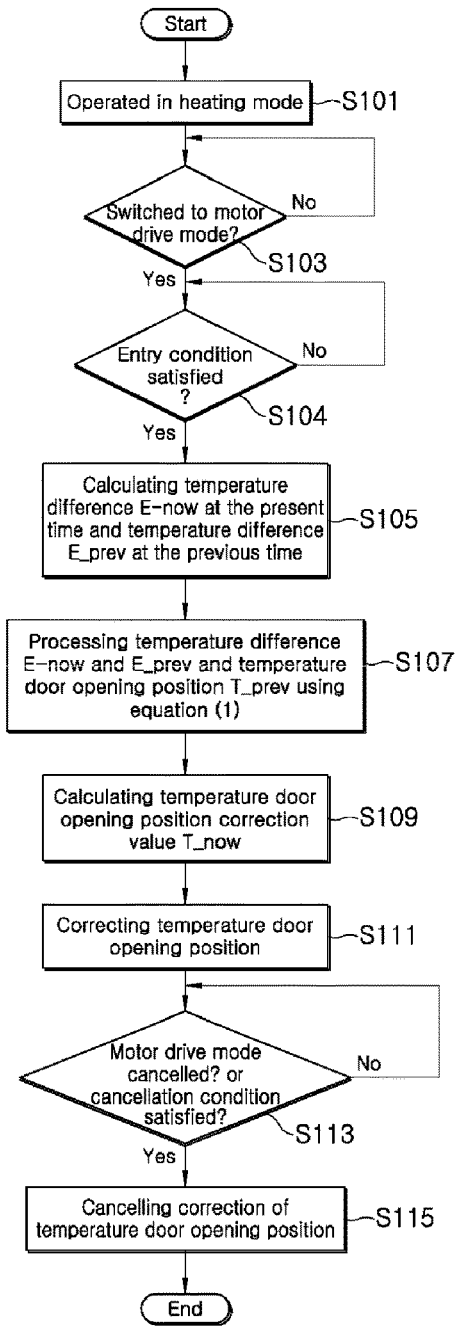
FIG. 7 is a flowchart illustrating an operation example of an air conditioning system for hybrid vehicles according to the present invention, in which example an opening position of a temperature door is compensated in a motor drive mode.
Figure 8:
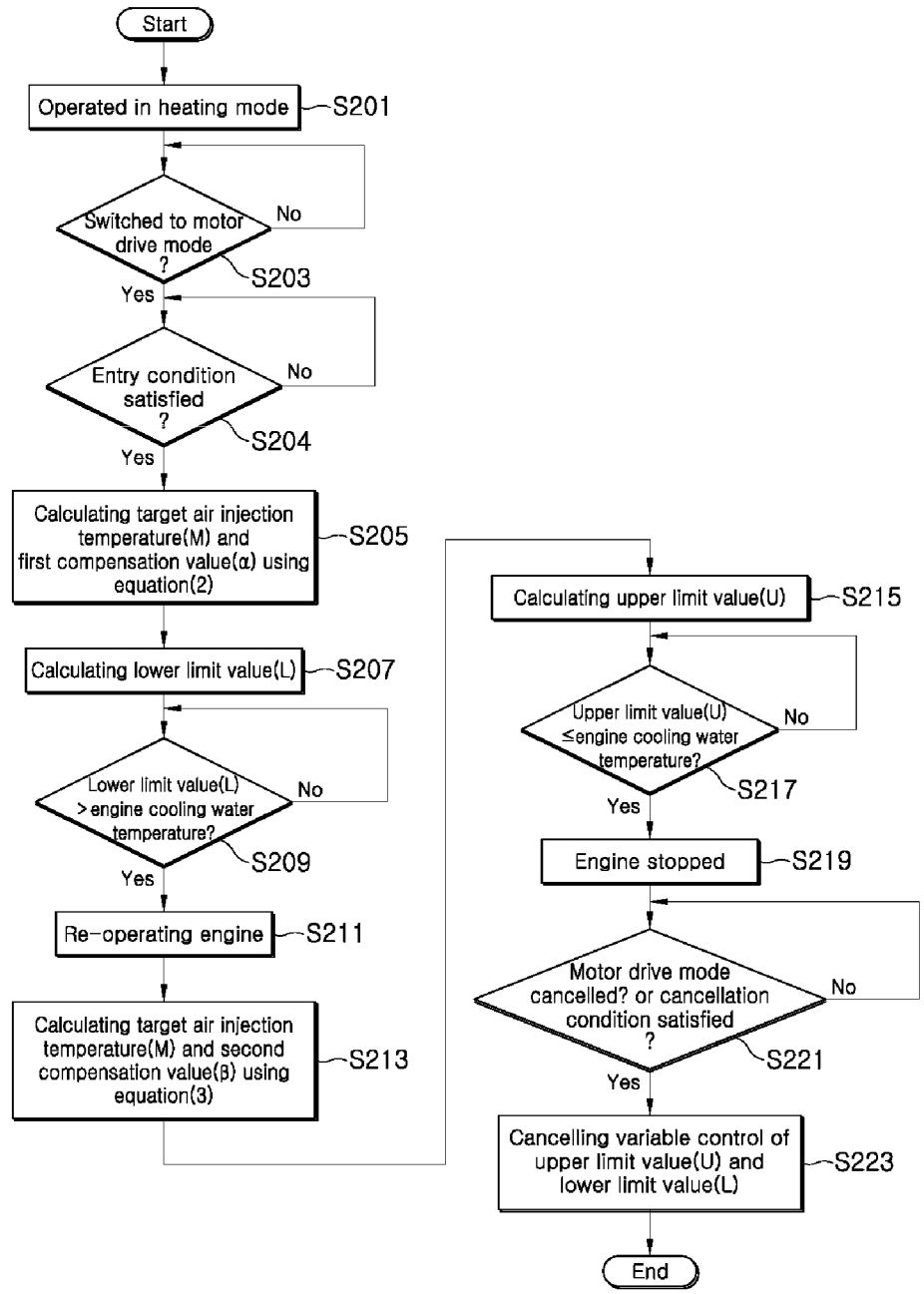
FIG. 8 is a flowchart illustrating an operation example of an air conditioning system for hybrid vehicles according to the present invention, in which example a re-operation of an engine is controlled in a motor drive mode.

Referring to FIGS. 4 and 7, the hybrid vehicle is operated in a heating mode (S101). In this state, determination is made as to whether the drive mode of the hybrid vehicle is switched from the engine drive mode to the motor drive mode (S103).

If the result of determination reveals that the drive mode of the hybrid vehicle is switched to the motor drive mode, the control unit 20 further determines whether the engine cooling water temperature and the state of the air conditioning system satisfy the predetermined entry conditions (S104). Specifically, the control unit 20 determines whether a condition that the engine cooling water temperature is equal to or lower than the first entry reference temperature obtained by adding the predetermined first temperature compensation value to the target air injection temperature, a condition that the temperature door 9 is moved to a maximum heating position, and a condition that the vehicle room injection air temperature is equal to or lower than the second entry reference temperature obtained by subtracting the predetermined second temperature compensation value from the target air injection temperature, are satisfied.

If the result of determination reveals that all the entry conditions are satisfied, the control unit 20 calculates a temperature difference E-now between a target air injection temperature and a vehicle room injection air temperature at the present time and a temperature difference E-prev between a target air injection temperature and a vehicle room injection air temperature at the previous time, for example, 5 seconds earlier than the present time, in a predetermined time interval, for example, in a several seconds interval from the time point at which the engine drive mode is switched to the motor drive mode (S105).

If the calculation of the temperature difference E-now and the temperature difference E-prev is completed, the control unit 20 processes the temperature differences E-now and E-prev and the temperature door opening position T-prev using equation (1) (S107) and calculates an opening position correction value T-now of the temperature door 9 with respect to the cold air path 1b and the hot air path 1c (S109).

If the opening position correction value T-now of the temperature door 9 is calculated, the control unit 20 corrects the opening position of the temperature door 9 in real time based on the opening position correction value T-now of the temperature door 9 (S111).

Then, the opening position of the temperature door 9 is corrected in view of the target air injection temperature and the injection air temperature changing factors. Thus, the opening position of the temperature door 9 is optimally corrected in conformity with the actual change in the vehicle room injection air temperature caused by the target air injection temperature and the injection air temperature changing factors.

As a result, it is possible to accurately compensate the vehicle room injection air temperature in the motor drive mode and to optimally control the vehicle room temperature in the motor drive mode.

While compensating and controlling the opening position of the temperature door 9 after entry into the motor drive mode, the control unit 20 determines whether the motor drive mode is cancelled or whether the predetermined cancellation condition is satisfied (S113). Specifically, determination is made as to whether a condition that the engine cooling water temperature is equal to or higher than the cancellation reference temperature obtained by adding the predetermined third temperature compensation value to the target air injection temperature, is satisfied.

If the result of determination reveals that the motor drive mode is cancelled or the cancellation condition is satisfied, the control unit 20 cancels the compensation control of the opening position of the temperature door 9 using equation (1) (S115).

Next, an operation example of controlling the re-operation of the engine 8 in the motor drive mode will be described with reference to FIGS. 4 and 8.

The hybrid vehicle is operated in a heating mode (S201). In this state, determination is made as to whether the drive mode of the hybrid vehicle is switched from the engine drive mode to the motor drive mode (S203).

If the result of determination reveals that the drive mode of the hybrid vehicle is switched to the motor drive mode, the control unit 20 further determines whether the engine cooling water temperature and the state of the air conditioning system satisfy the predetermined entry conditions (S204). Specifically, the control unit 20 determines whether a condition that the engine cooling water temperature is equal to or lower than the first entry reference temperature obtained by adding the predetermined first temperature compensation value to the target air injection temperature, a condition that the temperature door 9 is moved to a maximum heating position, and a condition that the vehicle room injection air temperature is equal to or lower than the second entry reference temperature obtained by subtracting the predetermined second temperature compensation value from the target air injection temperature, are satisfied.

If the result of determination reveals that all the entry conditions are satisfied, the control unit 20 processes the current target air injection temperature M and the first compensation value $\alpha$ at the entry time of the motor drive mode using equation (2) (S205) and calculates the lower limit value L in real time (S207).

After the lower limit value L is calculated in real time, the control unit 20 determines whether the engine cooling water temperature is reduced to the lower limit value L or less (S209).

If the result of determination reveals that the engine cooling water temperature is reduced to the lower limit value L or less, the control unit 20 re-operates the engine 8 (S211).

As the engine 8 is re-operated, the engine cooling water temperature is increased. As a result, the vehicle room injection air temperature is increased to heat the interior of the vehicle room.

When the engine 8 is re-operated, the control unit 20 processes the current target air injection temperature M and the second compensation value $\beta$ using equation (3) (S213) and calculates the upper limit value U in real time (S215).

After the upper limit value U is calculated in real time, the control unit 20 determines whether the engine cooling water temperature is increased to the upper limit value U or more (S217).

If the result of determination reveals that the engine cooling water temperature is increased to the upper limit value U or more, the control unit 20 stops the engine 8 (S219). The stoppage of the engine 8 limits consumption of fuel, thereby improving the fuel efficiency of the hybrid vehicle.

After entry into the motor drive mode, the control unit 20 variably controls the lower limit value L and the upper limit value U. In this state, the control unit 20 determines whether the motor drive mode is cancelled or whether the cancellation condition is satisfied (S221). Specifically, the control unit 20 determines whether a condition that the engine cooling water temperature is equal to or higher than the cancellation reference temperature obtained by adding the predetermined third temperature compensation value to the target air injection temperature, is satisfied.

If the result of determination reveals that the motor drive mode is cancelled or the cancellation condition is satisfied, the control unit 20 stops the variable control of the lower limit value L and the upper limit value U (S223).

According to the present air conditioning system configured as above, in the motor drive mode, the opening position of the temperature door 9 is corrected in response to the change in the vehicle room injection air temperature and in view of different factors that affect the actual change in the vehicle room injection air temperature. It is therefore possible to optimally correct the opening position of the temperature door 9 in conformity with the actual change in the injection air temperature.

Furthermore, in the motor drive mode, the opening angle of the temperature door 9 is optimally controlled in conformity with the actual change in the injection air temperature. It is therefore possible to, in the motor drive mode, accurately compensate the vehicle room injection air temperature and to optimally control the vehicle room temperature in the motor drive mode.

Furthermore, in the motor drive mode, the engine 8 is re-operated depending on the engine cooling water temperature. The engine re-operation time point is variably controlled according to the target air injection temperature. It is therefore possible to suppress the engine re-operation while optimally controlling the vehicle room injection air temperature in conformity with the target air injection temperature and to prevent the unnecessary re-operation of the engine 8.

Furthermore, in the motor drive mode, the engine 8 is re-operated depending on the engine cooling water temperature. The engine re-operation time point is controlled in association with the opening angle of the temperature door 9. It is therefore possible to sufficiently compensate the vehicle room injection air temperature by merely controlling the opening angle of the temperature door 9 without having to re-operate the engine 8 and to prevent the unnecessary re-operation of the engine 8.

In addition, since the unnecessary re-operation of the engine 8 is prevented, it is possible to prevent the frequent re-operation of the engine 8 and to improve the fuel efficiency.

While some preferred embodiments of the present invention have been described above, the present invention is not limited to these embodiments. It is to be understood that various changes and modifications may be made without departing from the scope of the invention defined in the claims.

What is claimed is:

1. An air conditioning system for hybrid vehicles, comprising:
    a control unit configured to re-operate an engine when an engine cooling water temperature is reduced to a lower limit value or less after entry into a motor drive mode, and configured to stop the engine if when the engine cooling water temperature is increased to an upper limit value or more; and
    an injected air temperature detection unit configured to detect a vehicle room injection air temperature, wherein the vehicle room injection air temperature is an actual temperature of air injected into a vehicle room;
    wherein the control unit controls the vehicle room injection air temperature so that the vehicle room injection air temperature is converged toward a target air injection temperature using a compensation value between the target air injection temperature and the vehicle room injection air temperature measured by the injected air temperature detection unit,
    wherein the control unit is configured to change the upper limit value and the lower limit value according to the target air injection temperature, wherein the target air injection temperature is calculated using an internal temperature condition or an external temperature condition and a user-set temperature so that, in the motor drive mode, a re-operation time point of the engine is actively changed according to the target air injection temperature,
    wherein the control unit is configured, in the motor drive mode, to re-operate the engine according to an opening position of a temperature door, and
    wherein the control unit is configured, in the motor drive mode, to re-operate the engine only when the target air injection temperature is equal to or higher than a value obtained by adding a predetermined temperature compensation value to the vehicle room injection air temperature, even when the engine cooling water temperature is reduced to the lower limit value or less.

2. The air conditioning system of claim 1, wherein the control unit is configured to calculate the lower limit value from the current target air injection temperature and a predetermined first compensation value using equation (1):

lower limit value=current target air injection temperature+predetermined first compensation value　　　(1), and wherein the control unit is configured to calculate the upper limit value from the current target air injection temperature and a predetermined second compensation value using equation (2):

upper limit value=current target air injection temperature+predetermined second compensation value　　　(2).

3. The air conditioning system of claim 2, wherein the predetermined first compensation value and the predetermined second compensation value are constant values for compensating a measurement error of the engine cooling water temperature, and the predetermined second compensation value is larger than the predetermined first compensation value.

4. The air conditioning system of claim 1, wherein the control unit is configured to, in the motor drive mode, re-operate the engine only when the temperature door is in a maximum heating position even if the engine cooling water temperature is reduced to the lower limit value or less.

5. The air conditioning system of claim 1, further comprising:
   a calculation unit configured to calculate a temperature difference E-now between the target air injection temperature and the vehicle room injection air temperature detected by the injected air temperature detection unit at a present time and a temperature difference E-prev between the target air injection temperature and the vehicle room injection air temperature detected by the injected air temperature detection unit at a previous time, in a predetermined time interval from a time point at which an engine drive mode is switched to the motor drive mode,
      wherein the control unit is configured to calculate an opening position correction value T-now of the temperature door with respect to a cold air path and a hot air path by processing the temperature differences E-now and E-prev calculated by the calculation unit in the predetermined time interval and a temperature door opening position T-prev available at the previous time point using equation (3):
   T-now=T-prev+Cp×[Gp×(E-now−E-prev)+Gi×E-now] . . . (1), where T-now is a temperature door opening position correction value, T-prev is a temperature door opening position available at the previous time, Cp is a proportional gain, Gp is a constant value with respect to a temperature difference, E-now is a temperature difference (° C.) between the target air injection temperature and the vehicle room injection air temperature available at the present time, E-prev is a temperature difference (° C.) between the target air injection temperature and the vehicle room injection air temperature available at the previous time, and Gi is an integral gain, and
   wherein the control unit is configured to correct the opening position of the temperature door based on the opening position correction value T-now of the temperature door.

6. The air conditioning system of claim 5, wherein the control unit is configured to, even in the motor drive mode, perform the change of the lower limit value and the upper limit value using equations (1), (2) and (3) and a correction of the opening position of the temperature door only when predetermined entry conditions are satisfied.

7. The air conditioning system of claim 6, wherein the entry conditions include a condition that the engine cooling water temperature is equal to or lower than the target air injection temperature, a condition that the temperature door is moved to a maximum heating position, and a condition that the vehicle room injection air temperature is equal to or lower than the target air injection temperature, and
   wherein the control unit is configured to, after entry into the motor drive mode, perform the change of the lower limit value and the upper limit value using equations (1), (2) and (3) and the correction of the opening position of the temperature door only when the condition that the engine cooling water temperature is equal to or lower than the target air injection temperature, the condition that the temperature door is moved to the maximum heating position, and the condition that the vehicle room injection air temperature is equal to or lower than the target air injection temperature, are satisfied.

8. The air conditioning system of claim 6, wherein the entry conditions include a condition that the engine cooling water temperature is equal to or lower than a first entry reference temperature obtained by adding a predetermined first temperature compensation value to the target air injection temperature, a condition that the temperature door is moved to a maximum heating position, and a condition that the vehicle room injection air temperature is equal to or lower than a second entry reference temperature obtained by subtracting a predetermined second temperature compensation value from the target air injection temperature, and
   wherein the control unit is configured to, after entry into the motor drive mode, perform the change of the lower limit value and the upper limit value using equations (1), (2) and (3) and the correction of the opening position of the temperature door (9) only when the condition that the engine cooling water temperature is equal to or lower than the first entry reference temperature, the condition that the temperature door is moved to the maximum heating position, and the condition that the vehicle room injection air temperature is equal to or lower than the second entry reference temperature, are satisfied.

9. The air conditioning system of claim 6, wherein if the motor drive mode is cancelled or a predetermined cancellation condition is satisfied while performing variable control of the lower limit value and the upper limit value and correction control of the opening position of the temperature door after entry into the motor drive mode, the control unit is configured to cancel the variable control of the lower limit value and the upper limit value and the correction control of the opening position of the temperature door.

10. The air conditioning system of claim 9, wherein the cancellation condition includes a condition that the engine cooling water temperature is equal to or higher than a cancellation reference temperature obtained by adding a predetermined third temperature compensation value to the target air injection temperature, and
   wherein if the condition that the engine cooling water temperature is equal to or higher than the cancellation reference temperature, the control unit is configured to cancel the variable control of the lower limit value and the upper limit value and the correction control of the opening position of the temperature door.

* * * * *